US011943382B2

(12) United States Patent
Kahlon et al.

(10) Patent No.: US 11,943,382 B2
(45) Date of Patent: Mar. 26, 2024

(54) SMART RECEIVE AUDIO SWITCHING FOR A CONVERGED DEVICE

(71) Applicant: MOTOROLA SOLUTIONS, INC., Chicago, IL (US)

(72) Inventors: Haim Kahlon, Shoam (IL); Hadi Shvartz, Bat Hadar (IL); Eitan Kugman, Savyon (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/805,699

(22) Filed: Jun. 7, 2022

(65) Prior Publication Data

US 2023/0396701 A1  Dec. 7, 2023

(51) Int. Cl.
*H04M 1/60* (2006.01)
*H04M 1/253* (2006.01)

(52) U.S. Cl.
CPC ............ *H04M 1/60* (2013.01); *H04M 1/253* (2013.01)

(58) Field of Classification Search
CPC .................. H04M 1/60; H04M 1/253; H04W 2215/2093; H04W 76/45; H04W 4/10; H04W 68/005; H04L 65/4061; H04B 17/318
See application file for complete search history.

(56) References Cited

U.S. PATENT DOCUMENTS 10,015,658 B1 * 7/2018 Alfaro ............... H04M 1/72418
10,637,419 B2   4/2020 Abdullah et al.
10,819,457 B1 * 10/2020 Alaburda ............ H04W 84/042
10,901,479 B1 *  1/2021 Boerger ................. G06F 1/3212
10,979,094 B2    4/2021 McIndoe et al.
11,128,955 B1 *  9/2021 Li ............................ H04R 3/04
(Continued)

FOREIGN PATENT DOCUMENTS

CN    201303356 Y    9/2009
CN    201781536 U    3/2011
(Continued)

OTHER PUBLICATIONS

The International Search Report and the Written Opinion, corresponding patent application No. PCT/US2023/023342 filed: May 24, 2023, dated Sep. 1, 2023, all pages.

*Primary Examiner* — Angelica Perez
(74) *Attorney, Agent, or Firm* — Barbara R. Doutre (57) ABSTRACT

An audio receiver for a converged portable radio (LMR/LTE radio) is provided with improved audio management. The converged device is managed by two different processors (BP/AP) and includes a selectable user setting for selecting either an LMR audio mode or an LTE audio mode (or both). Power up timing differences between the two processors is managed through a smart audio switch mechanism which includes AP control logic for selectively enabling and disabling an AP audio switch in response to operational status of both (AP/BP) processors during power up. The smart audio switch system further includes BP control logic for selectively enabling and disabling a BP audio switch in response to the operational status of the processors. Audio is played out at a single speaker. Both LTE audio and LMR audio can be mixed for a predetermined time during power up until the user selected audio mode has been established.

7 Claims, 4 Drawing Sheets

(56) References Cited

U.S. PATENT DOCUMENTS

2009/0024234 A1   1/2009  Archibald
2018/0248529 A1*  8/2018  Abdullah .............. H03G 3/007
2021/0037545 A1*  2/2021  Antilla .............. H04W 72/1215

FOREIGN PATENT DOCUMENTS

CN    101854705 B      2/2013
CN    104349433   *    2/2015

* cited by examiner

| AP And BP Power State | | AP - GPIO Output Lines | | BP - GPIO Output Lines | | AP - Audio Status | BP - Audio Status |
| --- | --- | --- | --- | --- | --- | --- | --- |
| AP Power | BP Power | AP_Audio_AP_EN | AP_Audio_BP_EN | BP_Audio_AP_EN | BP_Audio_BP_EN | Audio_AP_SW | Audio_BP_SW |
| Off | Off | X | X | X | X | No | No |
| On | Off | 1 | 1 | 0 | 0 | Yes | No |
| Off | On | X | X | 1 | 1 | No | Yes |

402, 404, 406

450

| AP And BP Power State | | AP - GPIO Output Lines | | BP - GPIO Output Lines | | AP - Audio Status | BP - Audio Status |
| --- | --- | --- | --- | --- | --- | --- | --- |
| AP Power | BP Power | AP_Audio_AP_EN | AP_Audio_BP_EN | BP_Audio_AP_EN | BP_Audio_BP_EN | Audio_AP_SW | Audio_BP_SW |
| On | On | 0 | 0 | X | X | No | Yes |
| On | On | 0 | X | X | 1 | No | Yes |
| On | On | X | X | 1 | 1 | No | Yes |
| On | On | 1 | 0 | 0 | X | Yes | Yes |
| On | On | 1 | X | 0 | 1 | Yes | Yes |
| On | On | X | 0 | 1 | X | No | Yes |
| On | On | 1 | 1 | 0 | 0 | Yes | No |

SMART RECEIVE AUDIO SWITCHING FOR A CONVERGED DEVICE

FIELD OF THE INVENTION

This application pertains to portable communication devices and more particularly to managing receive audio in a converged portable radio.

BACKGROUND OF THE INVENTION

Portable communication devices, such as portable public safety radios, may sometimes provide different types of operation, including mission critical communications and cellular type communications. For example, a converged portable radio may offer both land mobile radio (LMR) operation and long term evolution (LTE) operation. From a public safety audio perspective, it is important that audio from an incoming call be received and played out quickly during power up. It is further important that LMR baseband audio processing be used to manage mission critical communications, while LTE broadband processing may be used to manage LTE audio and data. As LTE processing continues to evolve, it is possible to utilize LTE broadband processing in a converged device for the benefits of lower current drain, high speed data, and interoperability to other LTE systems. However, it remains imperative that mission critical baseband audio processing be given priority, for the benefits of fast connectivity, loudness and strong signal strength. Hence, the ability to switch between operating systems, particularly the ability to switch from LTE broadband back to LMR baseband for mission critical communication is very important. Additionally, it is important to have backup operations in place to maintain audio communication in the case of a processing glitch (or reset) on either of the LMR or LTE processing sides.

Traditional digital receive signal strength indicators may not always be sufficient to support the needs of public safety communication, particularly when addressing the need to prioritize and maintain mission critical audio in a converged device.

Accordingly, there is a desire for improved audio management in a converged portable radio to ensure seamless transitions and simultaneous co-existence of the LMR and LTE systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an audio receiver for a converged portable radio having improved audio management that ensures seamless transitions and simultaneous co-existence of land mobile radio (LMR) system managed by a baseband (BP) processor and a long term evolution (LTE) system managed by an applications processor (AP). The converged device has a selectable user setting for selecting either an LMR audio mode or an LTE audio mode (or both). Power up timing differences between the two processors is managed through a smart audio switch system which includes AP control logic for selectively enabling and disabling an AP audio switch in response to operational status of both the AP processor and the BP processor during power up. The smart audio switch system further includes BP control logic for selectively enabling and disabling a BP audio switch in response to operational status of both the AP processor and the BP processor during power up. Both AP audio and BP audio can be temporarily mixed for a predetermined time during power up until the user selected audio mode has been established thereby minimizing audio loss.

Figure 1:
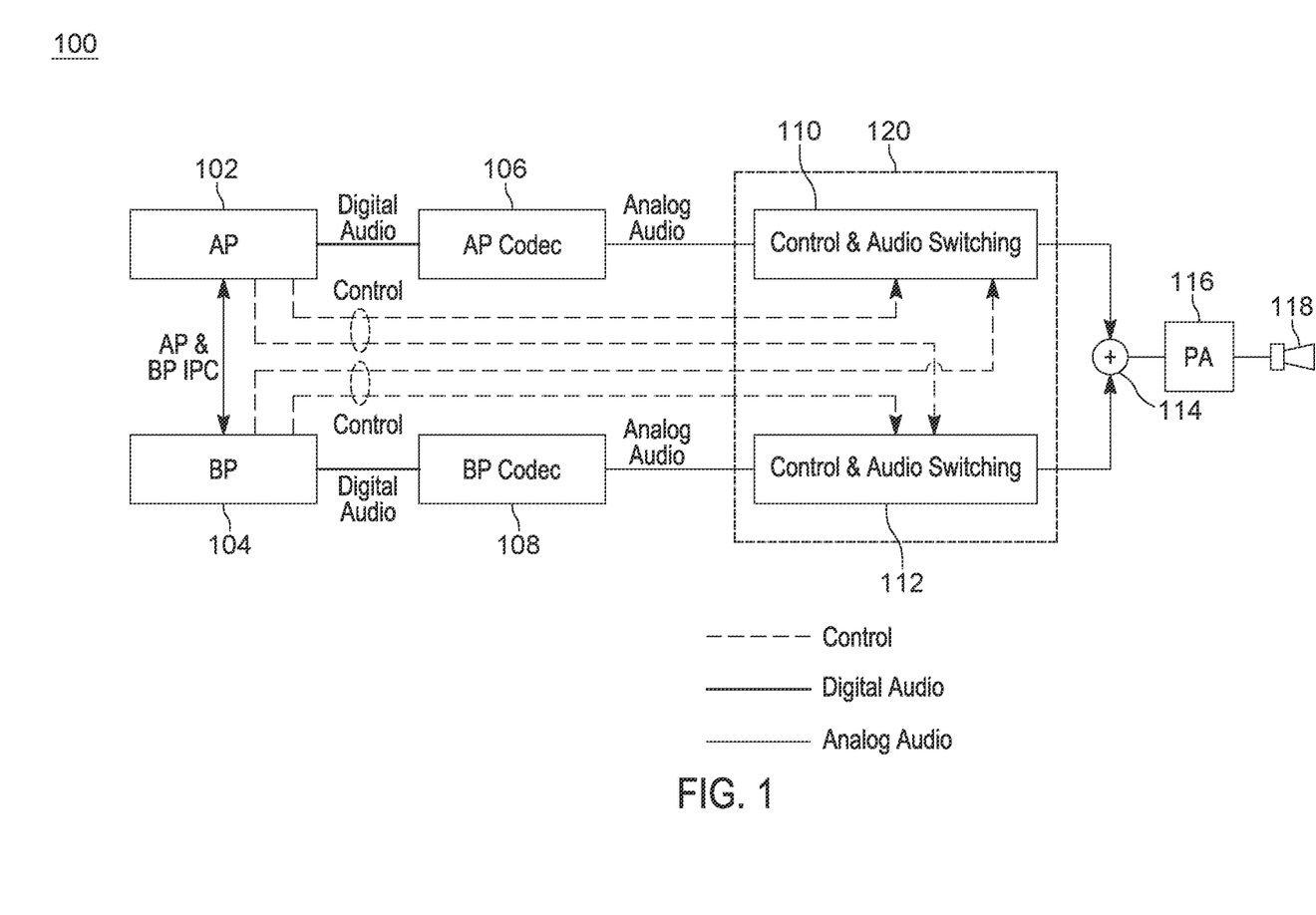
FIG. 1 is a block diagram of a receiver for a converged portable radio in accordance with some embodiments.

FIG. 1 is a block diagram of an audio receiver 100 for a converged portable radio in accordance with some embodiments. The converged portable radio is a battery powered communication device that comprises a plurality of user interfaces, such as a microphone, a speaker, a push-to-talk (PTT) button, and possibly a display. Converged functionality is provided through a plurality of different processors, such as application processor (AP) and a baseband processor (BP), and transceivers that enable narrowband operation and broadband operation of the portable radio. For example, a land mobile radio (LMR) transceiver may be used for narrowband (NB) operations, such as two-way radio (half-duplex) communications, and a broadband (BB) transceiver may be used for high speed communications. Examples of the broadband high speed communications may include Wi-Fi, LTE 4G, LTE 5G, or some other high-speed wireless broadband communication. The high speed communications may therefore enable cellular, full-duplex audio communications and secure internet access. The two processors (AP and BP) a have different power up times, processing capabilities, and current drain which can create challenges when dealing with different types of incoming calls, as was described in the background.

This application is focused on the front end audio receiver and the management of LMR audio (which will be referred to as BP audio) and LTE audio (which will be referred to as AP audio).

In accordance with the embodiments, the audio receiver 100 comprises applications processor (AP) 102 and baseband processor (BP) 104. The AP 102 processes received RF signals (from an LTE transceiver—not shown) into a digital AP audio output. An AP audio codec 106 is coupled to the AP processor, the AP codec includes a digital-to-analog converter (DAC) for converting the digital AP audio to an AP analog audio output signal.

The BP processor 104 processes received RF signals (from an LMR transceiver—not shown) into a digital BP audio output. A BP audio codec 108 is coupled to the BP processor 104, the BP codec, including a DAC, converts the digital BP audio to a BP analog audio output signal.

In accordance with the embodiments, the audio receiver 100 further comprises an audio switching mechanism 120 which provides an AP control and audio switching system 110 and BP control and audio switching 112. The AP control and audio switching system 110 comprises AP control logic with an AP audio switch (which will be described in further detail in FIG. 2). The AP audio switch conveys or blocks AP analog audio to an audio mixer 114. The BP control and audio switching 112 comprises BP control logic with a BP audio switch (which will also be described in further detail FIG. 2).

In accordance with the embodiments, the AP control logic selectively enables and disables the AP audio switch in response to operational status of both the AP 102 and the BP 104. The AP audio switch conveys or blocks AP analog audio to an audio mixer 114. In accordance with the embodiments, the BP control logic selectively enables and disables the BP audio switch in response to operational status of both the AP 102 and the BP 104. The BP audio switch conveys or blocks BP analog audio to the audio mixer 114. Detailed operations of the controlled switching are described in conjunction with further figures.

An audio power amplifier 116 receives the audio output from one or more of the enabled AP audio switch and/or BP audio switch. A single speaker 118 coupled to the output of the audio power amplifier 116 plays out the received audio.

Figure 2:
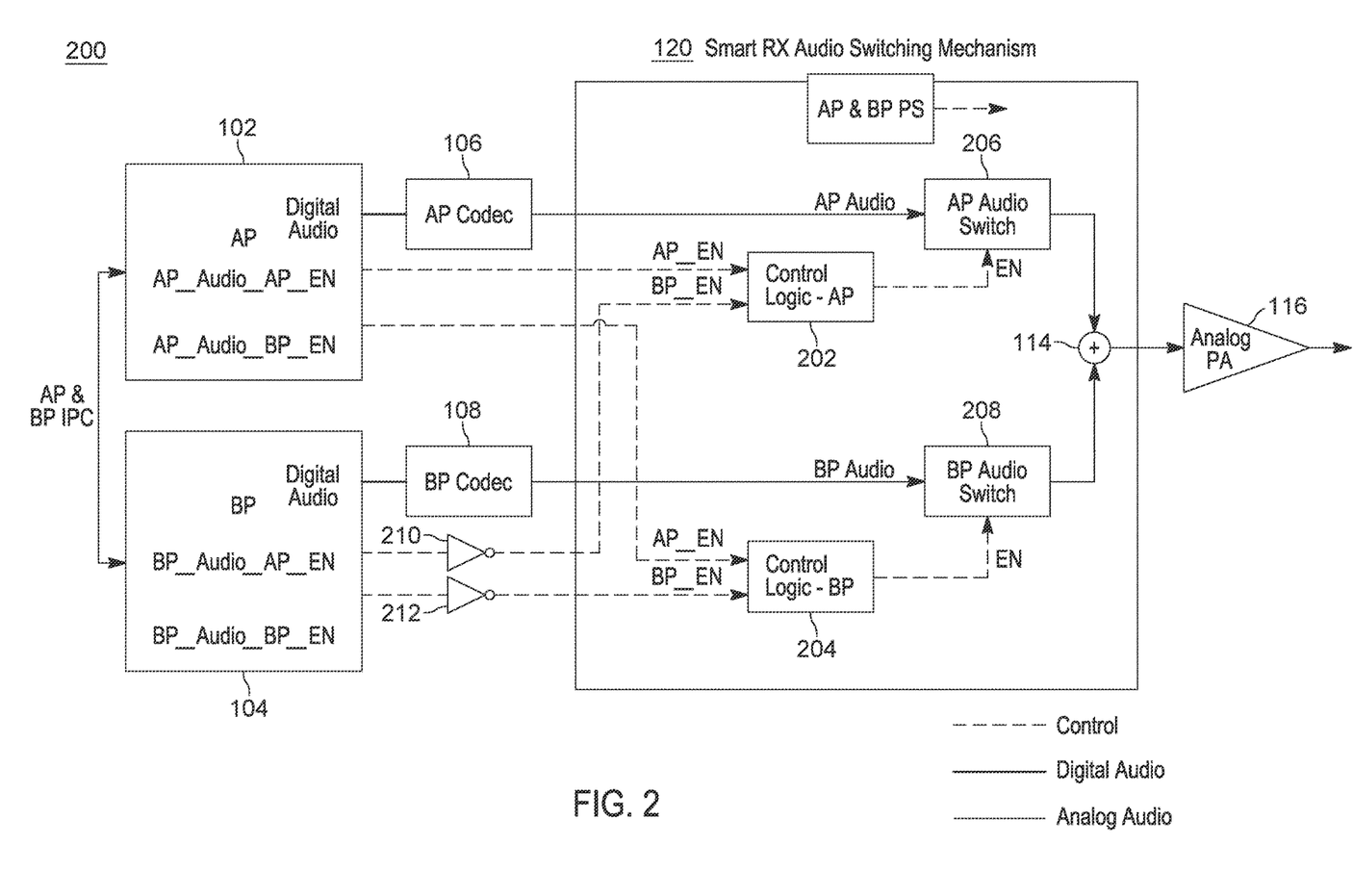
FIG. 2 is a more detailed block diagram of the audio receiver of FIG. 1 in accordance with some embodiments.

FIG. 2 is a more detailed block diagram of the audio receiver of FIG. 1 in accordance with some embodiments. The audio receiver comprises the AP 102 including two general-purpose input/output (GPIO) output ports (AP_Audio_AP_EN and AP_Audio_BP_EN) which are set based on the operational status of the AP processor. The BP 104 includes two GPIO output ports (BP_Audio_AP_EN and BP_Audio_BP_EN) which are set based on that-operational status of the BP processor. The priority of the calls LMR first or LTE first or both can be reconfigured by the user and the GPIOs output ports will be set accordingly.

The audio switching mechanism 120 may be powered by one or both of the AP or BP. Hence, the audio switching mechanism 120 will remain powered on even if one of the processors fails. The audio switching mechanism 120 comprises AP control logic 202 which controls an AP audio switch 206. The audio switching mechanism 120 comprises BP control logic 204 which controls a BP audio switch 208.

The AP_Audio_AP_EN output of AP 102 couples to the AP_EN input of the AP control logic 202. The AP_Audio_BP_EN output of AP 102 couples to the AP_EN input of the BP control logic 204.

The BP_Audio_AP_EN output of BP 104 operatively couples through an inverter 210 to the BP_EN input of the AP control logic 202. The BP_Audio_BP_EN output of BP 104 operatively couples through an inverter 212 to the BP_EN input of the BP control logic 204.

AP digital audio, generated by AP 102, is converted, via AP audio codec 106, into AP analog audio which is input to the AP audio switch 206. The AP audio switch 206 is enabled/disabled in accordance with the output of AP control logic 202, and the AP control logic 202 is set based on the power state of the AP 102 and BP 104.

BP digital audio, generated by BP processor 104, is converted via BP audio codec 108 into BP analog audio which is input to the BP audio switch 208. The BP audio switch 208 is enabled/disabled in accordance with the output of BP control logic 204, and the BP control logic 204 is set based on the power state of the AP102 and BP 104.

The mixing of audio occurs at mixer 114 when the AP audio and BP audio are present and input to the AP audio switch 206 and the BP audio switch 208, and both the AP audio switch 206 and BP audio switch 208 are enabled via their respective inputs from their respective AP control logic 202 and BP control logic 204. In accordance with the various embodiments, mixing takes place when a user changes their user preferred selection from AP to BP or BP to AP. The mixing takes place for a predetermined time to allow for smooth switching between the audio paths. Mixing of AP and BP audio may also be set as a user preferred default if desired, however, most users do prefer one audio setting (AP or BP) over the other. The temporary mixing of audio during the transition from one modem to the other advantageously avoids loss of audio.

The mixing of audio occurs when both AP audio and BP audio are present and the logic conditions of the AP control logic 202 enable the AP audio switch 206, and the BP control logic 204 enables the BP audio switch 208. For example, the logic conditions for audio mixing occur when the AP-GPIO output lines of AP_Audio_AP_EN and AP_Audio_BP_EN are (1, 0) and the BP-GPIO output lines of BP_Audio_AP_EN and BP_Audio_BP_EN are (0, x), where 'x' is a 'don't' care' condition having no impact. These logic conditions occur for a predetermined time when a user changes their preferred AP/BP audio selection from AP to BP and vice versa. The logic conditions input to the AP and BP control logic 202, 204 will change in accordance with the user preferred selected audio setting. For example, the changes in user preferred selection may take place during power up, when for example the BP is turning on first and therefore the BP will take audio control until the AP is fully turned on, and then switch, (or combine if the user preferred setting is set for combine). Examples of the combined/mixed audio settings are depicted, for example, at FIG. 4, Table 450 at row 454).

As another example, mixing may also occur under logic conditions when the AP-GPIO output lines of AP_Audio_AP_EN and AP_Audio_BP_EN are (1, x) and the BP-GPIO output lines of BP_Audio_AP_EN and BP_Audio_BP_EN are (0, 1). These logic conditions occur for a predetermined time when a user changes their preferred AP/BP audio selection from BP to AP (or vice versa). The GPIO outputs will change in accordance with the user selected audio. Another example of the combined/mixed audio settings is depicted, for example, at FIG. 4, Table 450 at row 455).

As an example, during power up conditions of the portable radio, the audio receiver's BP 104 powers up faster than the AP 102. For example a BP audio processor having a modem that supports LMR may have a turn-on time of approximately 11 seconds, while an AP audio processor having a modem that supports LTE which may have a turn-on time of approximately 50 seconds. The switching mechanism 120 supports BP audio operation until the AP 102 powers up.

Once the BP 104 is powered on, then BP audio can be played out. If the BP 104 is stuck reset, and the AP 102 comes on first, then the AP audio can be processed and played out using the AP 102. If AP audio is received it will also be processed and played out (mixed with the BP audio). After both processors turn on as part of the power up, then the radio will play out AP or BP in accordance with a user's preferred preprogrammed selection.

A user can switch their preferred preprogrammed audio setting from AP to BP or vice versa. If such a change occurs, then the AP and BP audio are mixed for a predetermined time (to promote a smooth transition between modems, prior to the newly selected AP or BP playout.

If incoming BP audio is determined (by the BP 104) to be mission critical audio, then the BP audio will be given priority and the AP audio will be switched off. Hence, if the BP audio is considered to be mission critical, the control and switching mechanism 120 will disable the AP audio switch 206 via AP control logic 202 even if the AP audio is considered the preferred user default audio. In other words, the BP 104 can always take control of the audio playout, even if the preference has been set for AP audio.

The AP control logic 202 and BP control logic 204 are responsive to processor triggers from each processor AP 102 and BP 104 as received at their respective AP_EN and BP_EN inputs. For example: processor reset; predetermined priority; and processor power down may all generate triggers to the control logic. In other words, the audio routing for playout at the speaker is controlled by the logic circuitry and switches and is independent of the presence of audio at the processor.

The switching mechanism 120 of FIG. 2 enables audio operation when one of the system's is corrupted/reset or off. For example, the logic conditions for enabling BP audio operation when the AP 102 is corrupted/reset or off are AP-GPIO output lines of AP_Audio_AP_EN and AP_Audio_BP_EN are (x, x) and the BP-GPIO output lines of BP_Audio_AP_EN and BP_Audio_BP_EN are (1,1).

As another example, the logic conditions for enabling AP audio operation when the BP 104 is corrupted/reset or off re AP-GPIO output lines of AP_Audio_AP_EN and AP_Audio_BP_EN are (1, 1) and the BP-GPIO output lines of BP_Audio_AP_EN and BP_Audio_BP_EN are (0,0).

If the power to both processors is off, then the AP and BP audio is off. These conditions are also shown at Table 400 of FIG. 4. The tables of FIG. 4, to be described later, depict the various combinations of AP and BP power states, the AP-GPIO output lines, BP-GPIO output lines to control the AP-Audio switch and the BP Audio switch.

Figure 3:
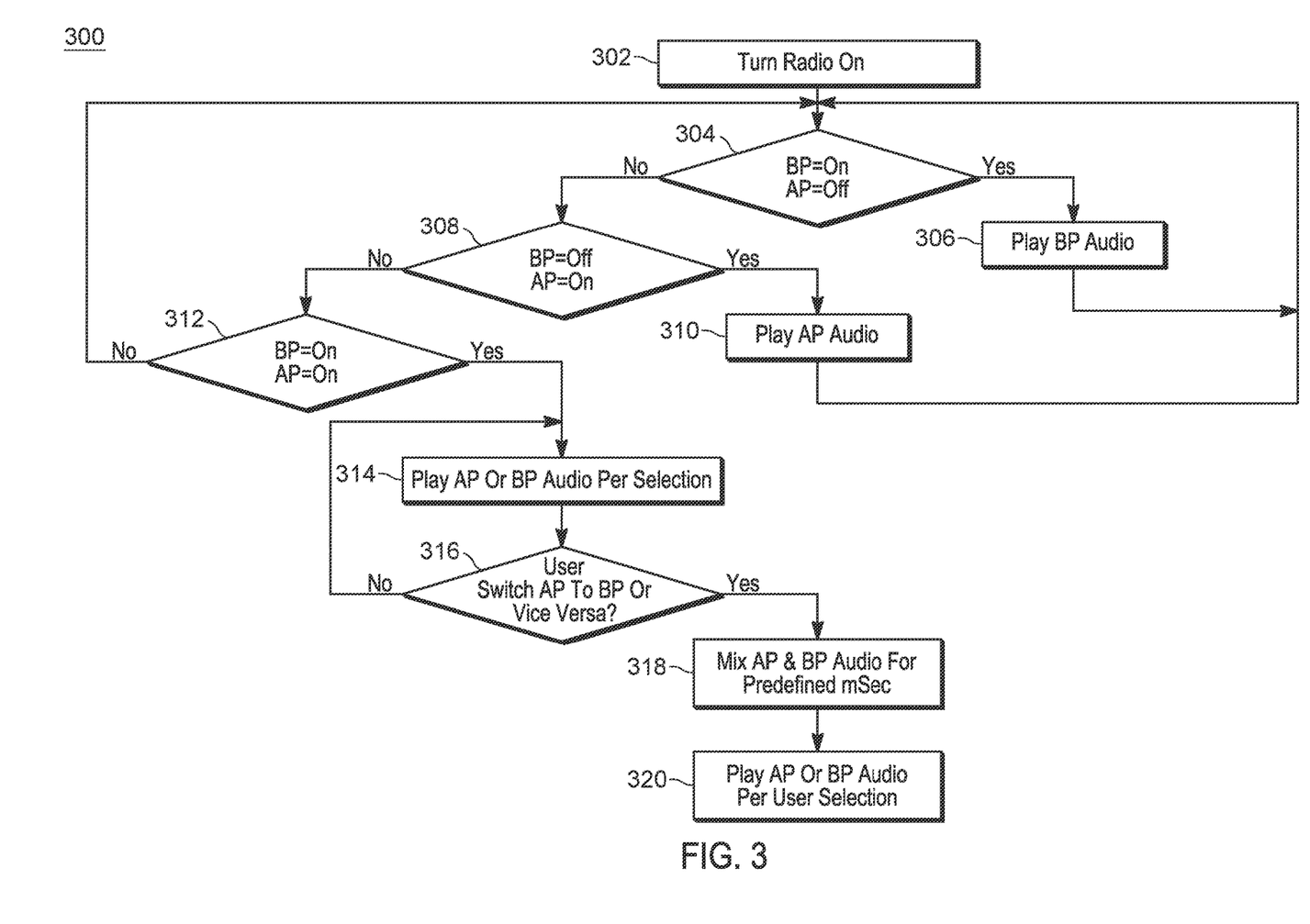
FIG. 3 is a flowchart of a method for controlling audio processing in a converged portable radio, in accordance with some embodiments.

FIG. 3 is a flowchart of a method 300 for controlling audio processing in a portable communication device in accordance with some embodiments. Method 300 begins at 302 by turning on power to the portable communication device, the portable communication device being a converged portable radio having a baseband processor (BP) and an applications processor (AP). A receive audio signal is received at both the BP and the AP. Under normal power up operation, the BP processor powers on more quickly than the AP processor, and thus a determination may be made at 304 as to whether the BP is ON and the AP is OFF. When the BP is ON and the AP is OFF, the method continues to 306 to process the received audio through the BP and play BP audio out of the speaker.

If, at 308, a determination is made that the BP is OFF and the AP is ON, then the received audio signal is processed through the AP and played out as AP audio at the speaker at 310. This condition may occur, for example, if the BP has been reset, corrupted, or otherwise turned off.

If a determination is made that both the BP is ON and the AP is ON at 312, then the received audio is processed and played in accordance with a pre-selected user setting at 314. The pre-selected user setting may be one of an AP setting or a BP setting. The BP and AP are both ON after the normal power up time for each processor.

The receive audio continues to play out in accordance with the pre-selected processor setting until a user selected switch to a new processing setting is made at 316. The new setting may be a switch from the AP setting to a BP setting, or from the BP setting to an AP setting.

When a switch in user selected processing occurs at 316, the method continues to 318 where a mixing of the receive audio signal takes place through both the AP and BP for a predetermined time. A mix of BP and AP analog audio thus plays out of the speaker when both the AP audio switch and BP audio switch are enabled. The mixed BP and AP analog audio plays out for the predetermined mixing time until switching is completed at 318. The predetermined mixing time may be configured and based on, for example, audio latency and/or audio delay. Once the transition is complete, the receive audio signal is then played out at the speaker in accordance with the selected new setting at 320.

Figure 4:
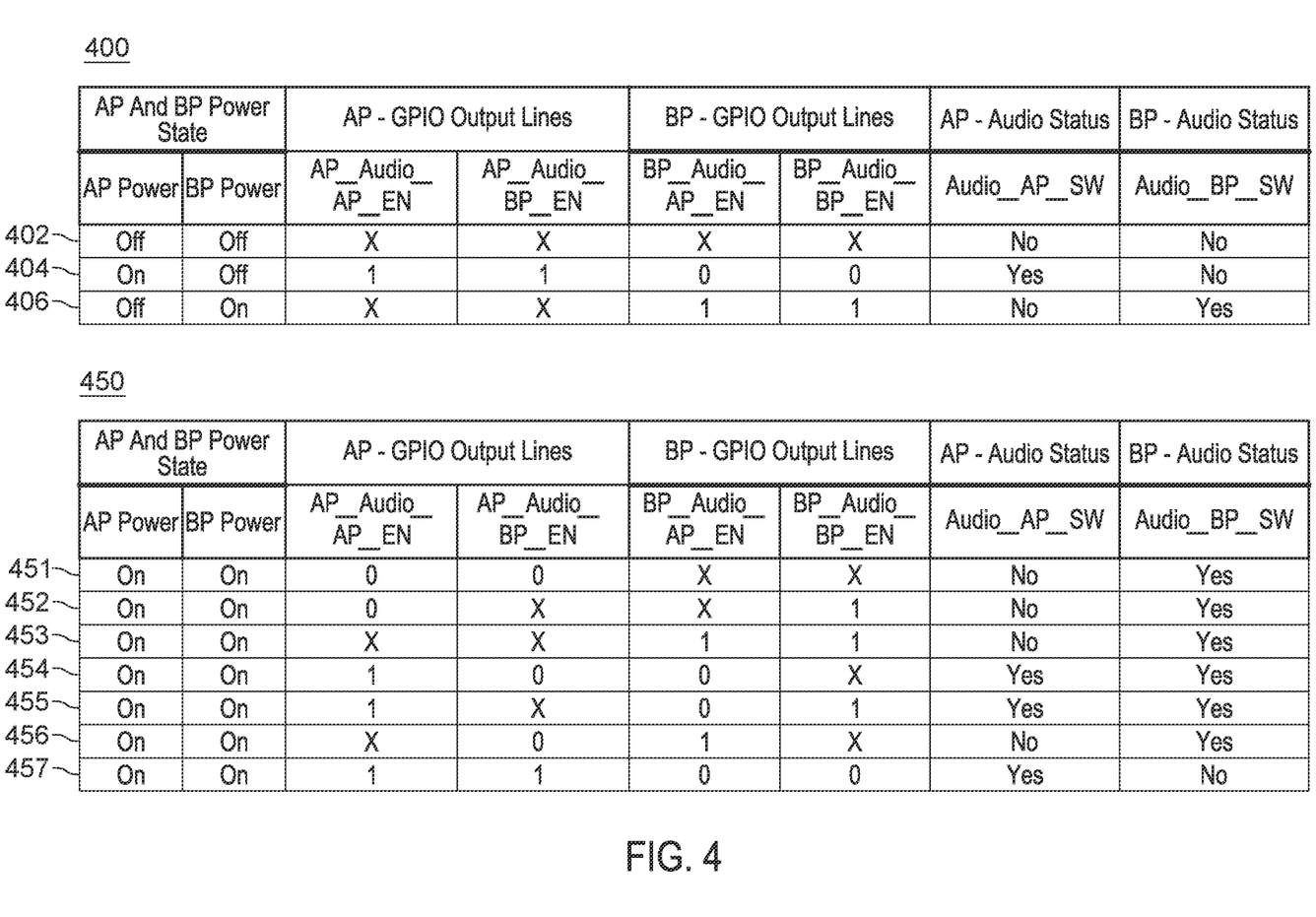
FIG. 4 depicts first and second logic tables associated with the converged portable radio in accordance with some embodiments.

FIG. 4 depicts first and second logic tables 400, 450 associated with the converged portable radio in accordance with some embodiments. The first Table 400 depicts an audio truth table during power up, such as when one of the systems (AP or BP) is corrupted, reset or shut off/powered down. The power state is shown in rows 402, 404 and 406 for various states of AP-GPIO Output lines and BP-GPIO Output lines, and the resulting AP-Audio Status and BP-Audio Status, such as were described in conjunction with the audio receiver of FIG. 2. The BP-GPIO Output lines are prior to the inverters 210, 212. Again, the 'x' represents a 'don't care' condition, having no impact.

When both processors are off (row 402), neither the AP nor BP audio switches are enabled and thus no audio is played out of the speaker.

Under conditions in which the AP is powered on and the BP is powered off, reset or stuck (row 404), then the AP-GPIO output lines go high (1, 1) and the BP-GPIO output lines go low (0, 0). These logic conditions enable the AP audio switch 206 and disable the BP audio switch 208. The receive audio is thus processed through the AP and played out as AP audio at the speaker.

Under conditions in which the AP is powered off and the BP is powered on (row 406), then the AP-GPIO output lines are 'x'/'don't care' (which may be logic high or low) and the BP-GPIO output lines go high (1, 1). These logic conditions enable the BP audio switch (208) and disable the AP audio switch (206). The receive audio is thus processed through the BP and played out as BP audio at the speaker.

The second Table 450 shows a truth table when both processors (AP and BP) are powered 'on' in conjunction with the AP-GPIO Output lines, BP-GPIO Output lines, and the resulting AP-Audio Status and BP-Audio Status. For the GPIO output lines, the 'x' represents a 'don't care' condition, having no impact. Again, in Table 450 both processors (AP and BP) are always ON, however it is not necessary that the audio stream be present for the logic conditions to be triggered. The 'Yes' and 'No' of the AP and BP Audio Status columns represent the audio status only, as a result of the AP and BP audio switches, wherein the audio status of 'Yes' means the audio is being played out at the speaker, and the audio status of 'No' means the audio is not being played out.

In Table 450, the AP audio is turned off and BP audio is turned on, when the AP audio switch 206 is turned OFF and the BP audio switch 208 is turned ON under the following logic conditions (as shown at rows 451, 452, 453, 456):

Row 451: AP-GPIO output lines of AP_Audio_AP_EN and AP_Audio BP_EN are (0, 0) and the BP-GPIO output lines of BP-Audio_AP_EN and BP_Audio_BP_EN are (x,x). For example, these GPIO outputs may occur under a use case where the AP is the audio control master and a BP incoming call comes in. In this case the AP is setting the audio switch to BP (BP-Audio Status is Yes).

Row 452: AP-GPIO output lines of AP_Audio_AP_EN and AP_Audio BP_EN are (0, x) and the BP-GPIO output lines of BP-Audio_AP_EN and BP_Audio_BP_EN are (x,1). For example, these GPIO outputs may occur under a use case where the AP is the audio control master but when the AP audio processor is stuck/reset, the BP has permission to switch the audio status to BP.

Row 453: AP-GPIO output lines of AP_Audio_AP_EN and AP_Audio BP_EN are (x,x) and the BP-GPIO output lines of BP-Audio_AP_EN and BP_Audio_BP_EN are (1,1). These logic conditions may occur under a use case where the user blocks AP incoming calls, and the BP is the audio control master that blocks the AP audio control.

Row 456: AP-GPIO output lines of AP_Audio_AP_EN and AP_Audio BP_EN are (x,0) and the BP-GPIO output lines of BP-Audio_AP_EN and BP_Audio_BP_EN are (1,x). For example, these GPIO outputs may occur under a use case where the BP detects an AP security issue, and the BP in response thereto, blocks AP audio, even when the AP is the audio control master.

Rows 454, 455 (mixing): Mixed audio occurs under conditions in which both AP and BP processors are on and both types of audio (AP and BP) are present (which may occur during power up for a predetermined time or as a user preferred default setting). Row 454: AP-GPIO output lines of AP_Audio_AP_EN and AP_Audio BP_EN are (1,0) and the BP-GPIO output lines of BP-Audio_AP_EN and BP_Audio_BP_EN are (0,x). For example, these GPIO outputs may occur under a use case where the AP is the audio control master which designates the mixing AP and BP audio.

Row 455: GPIO output lines of AP_Audio_AP_EN and AP_Audio BP_EN are (1,x) and the BP-GPIO output lines of BP-Audio_AP_EN and BP_Audio_BP_EN are (01). For example, these GPIO outputs may occur under a use case where an incoming BP emergency call comes in during an AP audio call. In this case, the BP has the option to mix its' BP audio with AP audio even though the AP is the audio control master.

Row 457: When audio is present in both systems, the AP audio plays out and the BP audio turned off, in response to the AP audio switch 206 being turned ON and BP audio switch 208 being turned OFF under the following logic conditions:

AP-GPIO output lines of AP_Audio_AP_EN and AP_Audio BP_EN are (1, 1) and the BP-GPIO output lines of BP-Audio_AP_EN and BP_Audio_BP_EN are (0,0). For example, these GPIO outputs may occur under use case where the user selects only AP calls as the preference. Hence, the AP is the audio control master and switches the BP audio off.

The audio switching operation can be summarized in Tables 1 and 2 below:

TABLE 1

AP Audio Switching (On State)

| AP_Audio_AP_EN | BP_Audio_AP_EN | Audio_AP_SW |
| --- | --- | --- |
| 0 | x | No |
| x | 1 | No |
| 1 | 0 | Yes |

Again, the AP_Audio_AP_EN and the BP_Audio_AP_EN are the GPIO lines from their respective processors 102, 104. The BP_Audio_AP_EN is prior to the inverter 210 of FIG. 2, and is thus inverted to a logic level high for input to AP control logic 202. Hence, the AP audio switch 206 switches ON for AP audio play out at the speaker in response to logic level high at both inputs of AP control logic 202.

TABLE 2

BP Audio Switching (On State)

| AP_Audio_BP_EN | BP_Audio_BP_EN | Audio_BP_SW |
| --- | --- | --- |
| 0 | x | Yes |
| x | 1 | Yes |
| 1 | 0 | No |

Again, the AP_Audio_AP_EN and the BP_Audio_AP_EN are the output lines from their respective processors 102, 104. The BP_Audio_BP_EN is prior to the inverter 212 of FIG. 2, and is thus inverted to a logic level high for input to BP control logic 204. Hence, the BP audio switch 208 switches ON for BP audio play out at the speaker in response to logic level high at both inputs of BP control logic 204.

Tables 1 and 2 taken together also show that the conditions for mixed audio to occur under the single condition where the AP audio switch 206 is turned ON and the two conditions under which the BP switch 208 is turned ON, which align with the conditions shown in Table 450 at rows 454 and 455.

Accordingly, the embodiments have provided for a smart audio switching mechanism in an audio receiver that improves the management of audio in a converged portable radio. The audio receiver supports two different audio processors (BP and AP), wherein the BP hosts an LMR modem for generating LMR digital audio (also referred to as BP audio), and the AP hosts an LTE modem for generating LTE digital audio (also referred to as AP audio). The audio receiver uses separate codecs to convert the digital audio streams to analog LMR audio and analog LTE audio. The hardware switch system includes an AP audio switch and a BP audio switch which are enabled and disabled in response to control logic shared by the AP and BP. The hardware switch system allows for the use of a single speaker shared and independently driven by selectively accessing the first and second codecs via the hardware switch system.

The smart audio switching mechanism advantageously compensates for different power up timing conditions of the BP and AP. The embodiments support public safety communications by providing fast audio switching during power up, where one processor powers up faster than the other. The embodiments allow for managing audio when one of the audio processors is stuck/reset or off during power up and when user preferences are changed. When both audio processors are operational, the embodiments support temporary audio mixing (mixed LMR audio and LTE audio) for a predetermined time to avoid audio losses during power up. Past approaches to managing audio in converged devices have included the use of a single codec being switched between two entities. With the past single codec approach, when an incoming call comes in on one entity/system while another call is taking place on the other entity/system the switch performs as a break-before-make. The break-before-make approach can incur audio losses. The embodiments of the present application have provided for an approach that for combining and transitioning from one audio stream to another on a converged device using a make-before-break approach which advantageously avoids audio losses. For example, this application provides for mixing (combining) LMR and LTE audio for a predetermined time (e.g. 500 ms) prior to switching off the non-required call. The embodiments and proposed smart switching approach take place without the use of traditional digital signal strength indicators (SSI).

The various embodiments have provided for coordinated, smooth and fast switching between different audio streams in the analog domain (AP and BP). The fast switching and mixing of audio until the switching is completed provide the benefits of minimized audio loss and low latency.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An audio receiver for a converged portable radio, comprising:
a baseband processor (BP) processor for generating digital BP audio;
a BP codec coupled to the BP processor, the BP codec including a D/A for converting the digital BP audio to a BP analog audio output signal;
an AP processor for generating digital AP audio;
an AP codec coupled to the AP processor, the AP codec including a D/A for converting the digital AP audio to an AP analog audio output signal;
an audio switch system comprising:
a BP audio switch having a BP audio input and an enable/disable input; and
an applications processor (AP) audio switch having an AP audio input and an enable/disable input;
BP control logic for selectively enabling and disabling the BP audio switch in response to operational status of both the AP processor and the BP processor;
AP control logic for selectively enabling and disabling the AP audio switch in response to operational status of both the AP processor and the BP processor;
an audio power amplifier for receiving the audio output from one or more of the enabled BP audio switch and/or AP audio switch;
a single speaker coupled to the output of the audio power amplifier; and
wherein a receive audio signal is received at the AP and the BP during power up of the portable radio, and the BP powers up faster than the AP, the switching enabling BP audio to play out until the AP powers up; and
when the AP powers up, then AP and BP audio are played out of the speaker in a mixed audio mode for a predetermined time.

2. The audio receiver of claim 1, wherein:
AP analog audio plays out of the speaker when the BP processor is reset or powered off; and
BP analog audio plays out of the speaker when the AP processor is reset or powered off.

3. The audio receiver of claim 1, wherein the AP control logic and BP control logic is responsive to processor triggers comprising:
processor reset;
predetermined priority; and
processor power down.

4. An audio receiver for a converged portable radio, comprising:
a baseband processor (BP) processor for generating digital BP audio;
a BP codec coupled to the BP processor, the BP codec including a D/A for converting the digital BP audio to a BP analog audio output signal;
an AP processor for generating digital AP audio;
an AP codec coupled to the AP processor, the AP codec including a D/A for converting the digital AP audio to an AP analog audio output signal;
an audio switch system comprising:
a BP audio switch having a BP audio input and an enable/disable input and an applications processor (AP) audio switch having an AP audio input and an enable/disable input;
BP control logic for selectively enabling and disabling the BP audio switch in response to operational status of both the AP processor and the BP processor;
AP control logic for selectively enabling and disabling the AP audio switch in response to operational status of both the AP processor and the BP processor;
an audio power amplifier for receiving the audio output from one or more of the enabled BP audio switch and/or AP audio switch; and
a single speaker coupled to the output of the audio power amplifier; and
wherein processing and playing of received audio signal is based on a pre-selected user setting and the operational status of the AP and BP, and wherein:
mixed BP and AP analog audio plays out of the speaker when both the AP audio switch and BP audio switch are enabled; and
the mixed BP and AP analog plays out for a predetermined mixing time until switching to the pre-selected user setting is completed, wherein when the predetermined mixing time is based on audio latency and/or audio delay.

5. A converged portable radio, comprising:
an audio receiver having first and second audio processors, the first audio processor comprising an applications processors (AP) hosting a long term evolution (LTE) modem and generating LTE digital audio, and a baseband processor (BP) hosting a land mobile radio (LMR) modem and generating LMR digital audio;
a first codec having a first D/A for converting the LTE digital audio to LTE analog audio;
a second codec having a second D/A for converting the LMR digital audio to LMR analog audio;
a hardware switch system having an AP audio switch and a BP audio switch, wherein control of the hardware switch system is shared by the AP and BP;
a single speaker shared and independently driven by selectively accessing the first and second codecs via the hardware switch system;
wherein the AP audio switch is enabled/disabled in response to AP control logic, the AP control logic being controlled by a first GPIO output of the AP and a first GPIO output of the BP; and
the BP audio switch is enabled/disabled in response to BP control logic, the BP control logic being controlled by a second GPIO output of the AP and a second GPIO output of the BP.

6. A converged portable radio, comprising:
an audio receiver having first and second audio processors, the first audio processor comprising an applications processors (AP) hosting a long term evolution (LTE) modem and generating LTE digital audio, and a baseband processor (BP) hosting a land mobile radio (LMR) modem and generating LMR digital audio;
a first codec having a first D/A for converting the LTE digital audio to LTE analog audio;
a second codec having a second D/A for converting the LMR digital audio to LMR analog audio;
a hardware switch system having an AP audio switch and a BP audio switch, wherein control of the hardware switch system is shared by the AP and BP;
a single speaker shared and independently driven by selectively accessing the first and second codecs via the hardware switch system;
wherein the shared control of the hardware switch system by the AP and the BP is configured to:
enable exclusive access to the single speaker from each audio processor based on pre-defined audio priority, and enable shared access to the single speaker in a mixed audio mode where AP analog audio and BP analog audio are temporarily mixed for a predetermined time while transitioning between two audio streams (LMR analog audio/LTE analog audio).

7. A converged portable radio, comprising:

an audio receiver having first and second audio processors, the first audio processor comprising an applications processors (AP) hosting a long term evolution (LTE) modem and generating LTE digital audio, and a baseband processor (BP) hosting a land mobile radio (LMR) modem and generating LMR digital audio;

a first codec having a first D/A for converting the LTE digital audio to LTE analog audio;

a second codec having a second D/A for converting the LMR digital audio to LMR analog audio;

a hardware switch system having an AP audio switch and a BP audio switch, wherein control of the hardware switch system is shared by the AP and BP;

a single speaker shared and independently driven by selectively accessing the first and second codecs via the hardware switch system;

an audio mixer coupled to outputs of the AP audio switch and the BP audio switch of the hardware switch system; and an audio power amplifier coupled between the audio mixer and the single speaker.

* * * * *